United States Patent [19]

Sakamoto et al.

[11] 4,066,298

[45] Jan. 3, 1978

[54] HYDRAULICALLY TRANSPORTED CAPSULE

[75] Inventors: Masakatsu Sakamoto, Matsudo; Syosaku Watanabe, Ushikumachi; Takafumi Karino, Tomobemachi; Junichi Yazu, Shimoinayoshi; Kouichi Takashima, Ibaraki; Hiroshi Miyashiro, Tokyo; Takeo Takagi, Shimoinsayoshi; Takao Konno, Shimoinayoshi, all of Japan

[73] Assignee: Hitachi, Ltd., Japan

[21] Appl. No.: 714,181

[22] Filed: Aug. 13, 1976

[30] Foreign Application Priority Data

Oct. 24, 1975 Japan .................... 50-144134[U]

[51] Int. Cl.² .............................................. B65G 51/06
[52] U.S. Cl. .................................... 302/2 R; 243/35
[58] Field of Search .................... 302/2 R, 14, 15, 16; 243/32, 33, 34, 35, 39; 220/352, DIG. 19; 215/228, 295, 305, 329; 104/138 R, 138 G, 154, 155

[56] References Cited

U.S. PATENT DOCUMENTS

| 652,979 | 7/1900 | Pond | 243/33 |
| 992,823 | 5/1911 | Stoddard | 243/39 |
| 1,686,514 | 10/1928 | Carvalho | 215/295 |
| 1,784,089 | 12/1930 | Carr | 215/295 |
| 3,633,976 | 1/1972 | Kruyer | 302/2 R |
| 3,642,232 | 2/1972 | Kelley | 243/35 |
| 3,655,153 | 4/1972 | Terrell | 243/39 X |
| 3,667,702 | 6/1972 | Kelley | 243/39 X |
| 3,949,953 | 4/1976 | Hopkins | 243/33 X |

FOREIGN PATENT DOCUMENTS

| 2,212,952 | 9/1973 | Germany | 104/138 R |
| 2,418,899 | 10/1975 | Germany | 243/39 |

Primary Examiner—John J. Love
Assistant Examiner—James L. Rowland
Attorney, Agent, or Firm—Craig & Antonelli

[57] ABSTRACT

A capsule having a cylindrical shell for containing goods to be transported, and a cover member adaped to be fitted over one end of the shell. The cover member is made from a flexible material and is provided on the leading end of the shell. The provision of the cover member of a flexible material avoids damage to or deformation of the capsule which would otherwise be caused by collision against the preceding or the next following capsule, and reduces the resistance offered to the movement of the capsule by the tubular passageway through which the capsule is moved.

4 Claims, 8 Drawing Figures

HYDRAULICALLY TRANSPORTED CAPSULE

BACKGROUND OF THE INVENTION

This invention relates to hydraulically transported capsules which contain goods to be transported and are moved through a tubular passageway through which a liquid, such as water, flows, for hydraulically transporting the goods contained in the capsules.

Heretofore, the capsules of the type described usually has had a spherical or cylindrical shape.

When capsules of the cylindrical shape are moved through the tubular passageway by the force of a liquid, such as water, the capsules move in rolling movement along the upper portion or the lower portion of the inner wall surface of the tubular passageway depending on the specific gravity of the capsules. Thus, relatively little resistance is offered to the movement of capsules by the tubular passageway and the capsules can be moved smoothly without any trouble.

However, the capsules of the spherical shape have the disadvantages of requiring a complex structural arrangement for mounting a cover member on each capsule, and of being small in the capacity for containing goods to be transported. Because of these disadvantages of the capsules of the spherical shape, it has hitherto been customary to use capsules of the cylindrical shape as capsules of the type adapted for hydraulically transporting goods as aforementioned. When the capsules of the cylindrical shape are used for the stated purpose, the capsules move in sliding movement along the inner wall surface of the tubular passageway depending on its specific gravity while repeatedly colliding with the preceding capsule or the next following capsule. Thus, the capsules of the cylindrical shape are subjected to a high resistance offered by the tubular passageway, and require high power as a source of force for moving the same.

U.S. Pat. No. 3,633,976 discloses means for obviating these disadvantages. The capsule disclosed in said U.S. patent has a collar mounted at the forward end thereof, so that the collar is brought at its outer periphery into contact with the inner wall surface of the tubular passageway so as to slidably support the capsule when the capsule is moved by the force of flowing water.

However, the capsule of the type disclosed in the U.S. patent referred to above is not without a disadvantage. If the collar has on its periphery an acute-angled step, the step may be engaged with or hooked against a step on a joint of pipes forming the tubular passageway or on a junction of the tubular passageway, thereby causing jamming of the capsules which might result in blocking of the tubular passageway through which the capsules are moved.

Moreover, since the capsule of the aforesaid U.S. patent has an entirely rigid structure, there is the hazard of an end portion of the capsule being damaged or undergoing deformation in the event that there is a change in the rate of movement of the capsule, particularly when the capsule is subjected to high forces of inertia in starting or stopping. If the capsule is severely damaged or deformed, the cover member of the capsule would be dislodged from its position on the capsule and the goods transported by the capsule would be scattered in the tubular passageway, thereby obstructing the movement of other capsules through the tubular passageway and rendering the transportation system not available for further use. Thus, the capsule of the type described in the aforementioned U.S. patent may make it impossible to carry out transportation of goods with safety by using the hydraulic force.

SUMMARY OF THE INVENTION

An object of this invention is to provide a hydraulically transported capsule which is simple in construction and which can be manufactured at low cost.

Another objects of the invention is to provide a hydraulically transported capsule wherein damage to or deformation of the capsule due to collision can be avoided.

Still another object of the invention is to provide a hydraulically transported capsule wherein the outer peripheral surface of the cover member serves as a sliding surface of the capsule, whereby the resistance offered to the movement of the capsule by the tubular passageway can be minimized.

According to the invention, there is provided a hydraulically transported capsule comprising a cylindrical shell adapted to contain goods to be transported, and a cover member made from a flexible material and adapted to be fitted over one end portion of said shell, said shell being formed at its leading end portion with a fitting portion for said cover member, said cover member being fitted over the fitting portion of the shell to close said one end portion of the shell, and said cover member having an outer peripheral surface serving as a sliding surface of the capsule.

DESCRIPTION OF THE PREFERRED EMBODIMENTS

Figure 1:
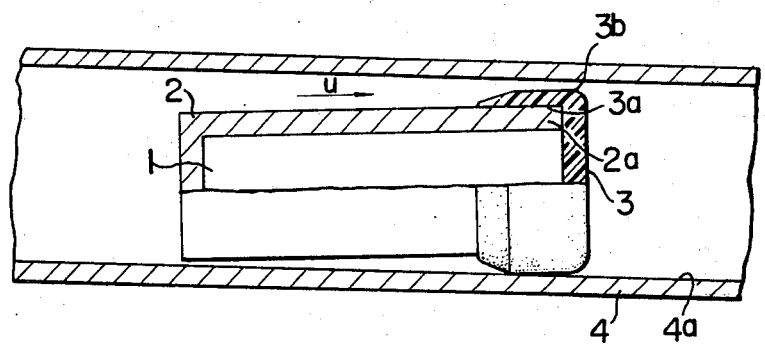
FIG. 1 is a fragmentary sectional front view of the hydraulically transported capsule comprising one embodiment of this invention and shown as being disposed in a tubular passageway.

Preferred embodiments of the invention will now be described with reference to the accompanying drawings. In FIG. 1, there is shown, in a fragmentary sectional front view, a hydraulic transportation capsule comprising one embodiment of the invention and shown as being disposed in a tubular passageway. The capsule 1 comprises a shell 2 containing goods to be transported, and a cover member 3. The cover member 3 has an engaging surface portion 3a which engages an engaging surface portion at the outer periphery of a leading end portion 2a of the shell 2 of the capsule 1 which moves in the direction of an arrow u. The cover member 3, which is made from a flexible material, such as polyethylene, nylon, Teflon (trade mark), etc., may be threadably connected to or force-fitted over the shell 2. The cover member 3 has an outer peripheral surface which constitutes a sliding surface 3b adapted to be brought into contact with an inner wall surface 4a of a tubular passageway 4.

Figure 2:
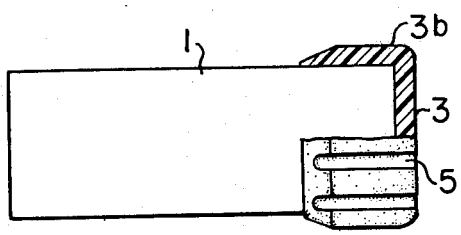
FIG. 2 is a fragmentary sectional front view of the hydraulically transported capsule shown in FIG. 1, with its cover member being formed in its sliding surface with axially oriented grooves.

The sliding surface 3b may be formed therein with axially oriented grooves 5 as shown in FIG. 2. The provision of such grooves 5 permits the liquid to flow through the grooves when the sliding surface 3b is in sliding contact with the inner wall surface 4a, thereby minimizing the resistance offered to the moving capsule by the tubular passageway.

If the capsule 1 constructed as aforesaid is placed in the tubular passageway 4 through which a liquid flows, the sliding surface 3b will be brought into contact with the inner wall surface 4a and slidably supported thereby. Thus, the water-tightness effect required for transporting the capsule 1 can be provided by the sliding surface 3b maintained in contact with the inner wall surface 4b, and the other end portion of the capsule 1 is floating in the liquid during transportation, so that the resistance offered to the movement of the capsule 1 by the tubular passageway 4 can be markedly reduced.

Meanwhile forces of inertia which are produced by high acceleration of the capsule at the time of starting or stopping can be absorbed by the shock absorbing action of the cover member 3, thereby ensuring safe transportation of the capsule.

Figure 3:
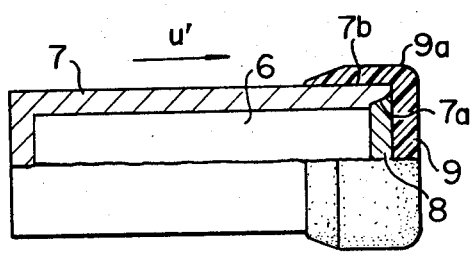
FIG. 3 is a fragmentary sectional front view of the hydraulically transported capsule comprising another embodiment of the invention.

FIG. 3 shows, in a fragmentary front view, a hydraulically transported capsule comprising another embodiment of the invention, wherein the capsule 6 comprises a shell 7, an inner cover member 8 attached to an inner engaging surface 7a at the inner periphery of a leading end portion of the shell 7 of the capsule 6 moving in the direction of an arrow u', and an outer cover member 9 fitted over an outer engaging portion 7b at the outer periphery of the leading end portion of the shell 7.

The inner cover member 8 attached to the inner engaging surface 7a is made from a rigid material which is identical to the material from which the shell 7 is made, while the outer cover member 9 fitted over the outer engaging portion 7b is made from a flexible material which is identical to the material from which the cover member 3 disclosed in FIG. 1 and FIG. 2 is made. The outer cover member 9 is formed on its outer periphery with a sliding surface 9a which is adapted to be brought into sliding engagement with the inner wall surface of the tubular passageway when the capsule 6 is moved by the force of the flowing liquid.

The provision of the inner and outer cover members enables the contents of the capsule 6 or the goods to be hydraulically transported to be positively contained in the shell 7 without the liquid portion of the contents leaking into the tubular passageway.

FIG. 4 to FIG. 8 show modified forms of the sliding surface formed in the cover member. The modified forms of the sliding surface will be described with reference to the capsule 1 shown in FIG. 1.

Figure 4:
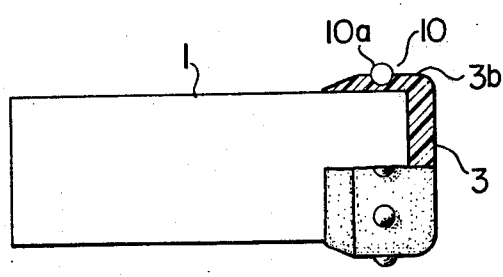
FIG. 4 is a fragmentary sectional front view of the capsule of FIG. 1, in explanation of sliding means comprising a plurality of small balls provided as supporters to the sliding surface of the cover member.
Figure 5:
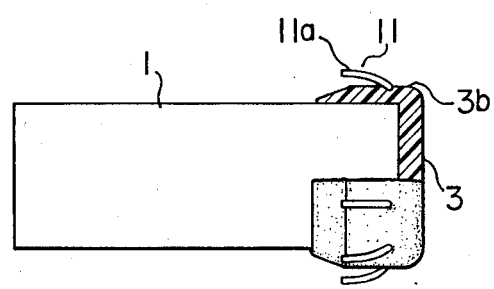
FIG. 5 is a fragmentary sectional front view of the capsule of FIG. 1, in explanation of sliding means comprising a plurality of resilient members provided as supporters to the sliding surface of the cover member.

The cover member 3 shown in FIG. 4 is provided with sliding means 10 comprising a plurality of small balls 10a, such as balls of a ball bearing, arranged radially and firmly fixed in the sliding surface 3b on the outer periphery of the cover member 3. On the other hand, the cover member 3 shown in FIG. 5 is provided with sliding means 11 comprising resilient supporters 11a which may be in the form of needles or plates. The supporters 11a are also arranged radially and firmly fixed in the sliding surface 3b. The sliding means 11 may be disposed at right angles to the capsule 1 or may slightly tilt rearwardly with respect to the capsule 1. The sliding means 10 and 11 may be provided in a plurality of rows axially of the sliding surface 3b.

By this arrangement, the sliding surface 3b of the cover member 3 can be slidably supported by the inner wall surface of the tubular passageway 4 when the capsule 1 is moved therethrough by the force of liquid. Thus, when the capsule 1 moves its rear end portion which has no sliding surface floats in the liquid without coming into contact with the inner wall surface of the tubular passageway.

Figure 6:
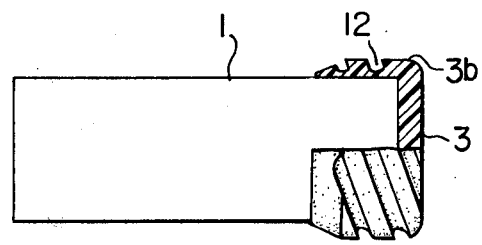
FIG. 6 is a fragmentary sectional front view of the capsule of FIG. 1, in explanation of a spiral groove formed in the sliding surface of the cover member.
Figure 7:
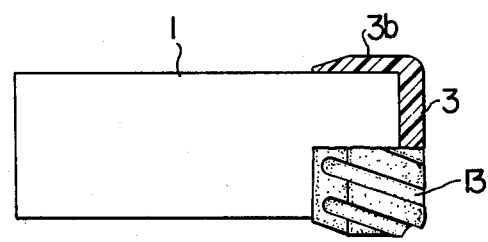
FIG. 7 is a fragmentary sectional front view of the capsule of FIG. 1, in explanation of inclined grooves formed in the sliding surface of the cover member.

In FIG. 6, the sliding surface 3b on the outer periphery of the cover member 3 is shown as being formed therein with a spiral groove 12. The sliding surface 3b of the cover member 3 shown in FIG. 7 is formed therein with a plurality of grooves 13 suitably inclined with respect to the longitudinal axis of the capsule 1.

Figure 8:
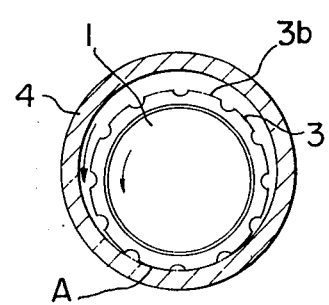
FIG. 8 is a view in explanation of the operation of the grooves shown in FIG. 6 and FIG. 7.

FIG. 8 shows, in vertical cross-section, the capsule 1 comprising the cover member 3 constructed as aforementioned and placed in the tubular passageway 4 in which liquid is caused to flow. The capsule 1 will move forwardly in a straight line while revolving counter clockwise, for example, about its own axis. The higher the rate of revolution of the capsule 1 about its own axis, the more positively it will move ahead in a straight line. Thus, the movement of the capsule upwardly or downwardly or leftwardly or rightwardly, or what is referred to as "a swinging movement" of the capsule 1, can be prevented during the forward movement of the capsule in the tubular passageway 4, so that the capsule 1 can move along the center axis of the tubular passageway 4 without coming into contact with the inner wall surface 4a. This greatly reduces the resistance offered to the moving capsule 1 by the tubular passageway 4.

Meanwhile revolution of the capsule about its own axis produces a bearing action through the intermediary of the liquid between the inner wall surface 4a of the tubular passageway 4 and the capsule 1. Also, as shown in FIG. 8, revolution of the capsule 1 about its own axis will result in the liquid flowing into a portion A, such liquid performing the function of liquid lubrication which is similar to the lubrication of a bearing. Thus, the resistance offered to the moving capsule 1 by the tubular passageway 4 can be greatly reduced.

The effects achieved by the features of the invention described above can be summarized as follows:

1. The capsule is simple in construction and can therefore be produced at low cost.

2. The provision of a cover member of a flexible material to one end portion of the capsule enables the inertia acting on the capsule in the direction of its movement to be readily absorbed by the shock absorbing action of the cover member.

3. The cover member has an outer peripheral surface which serves as a sliding surface for the capsule, so that the resistance offered to the movement of the capsule by the tubular passageway can be greatly reduced. The provision of a spiral groove, a plurality of grooves inclined with respect to the longitudinal axis of the capsule, or resilient supporters on the sliding surface permits the capsule to move ahead while bodily floating in the liquid. By this arrangement, it is possible to absorb vibration of the capsule or absorb shock to which the capsule is subjected when the capsule moves through steps formed at the joints of the pipes or when there are steps due to the misalignment at the joints of the pipes which are joined together to constitute the tubular passageway. Thus, the capsule can be moved through the tubular passageway without making any noise.

We claim:

1. A hydraulically transported capsule comprising a cylindrical shell adapted to contain goods to be transported, and a cover member made from a flexible material and adapted to be fitted over one end portion of said shell, said shell being formed at its leading end portion with a fitting portion for said cover member, said cover member being fitted over said fitting portion of the shell to close said one end portion of the shell, and said cover member having an outer peripheral surface serving as a sliding surface of the capsule, wherein the sliding surface of said cover member has sliding means comprising a plurality of supporters arranged at least in a row circumferentially of the cover member, said supporters comprising elongated resilient members embedded in said sliding surface and extending radially outwardly of said sliding surface.

2. A hydraulically transported capsule as claimed in claim 1, wherein the leading end portion of said shell has an inner and an outer fitting portion on the inner periphery and the outer periphery thereof respectively, said cover member made of the flexible member being fitted over said outer fitting portion, and wherein said capsule further includes an inner cover member fitted on said inner fitting portion and made of a rigid material, said first-mentioned cover member being fitted over said outer fitting portion so as to cover said inner cover member.

3. A hydraulically transported capsule comprising a cylindrical shell adapted to contain goods to be transported, and a cover member made from a flexible material and adapted to be fitted over one end portion of said shell, said shell being formed at its leading end portion with a fitting portion for said cover member, said cover member being fitted over said fitting portion of the shell to close said one end portion of the shell, and said cover member having an outer peripheral surface serving as a sliding surface of the capsule, wherein the sliding surface of said cover member is formed therein with a plurality of grooves inclined with respect to the longitudinal axis of the shell.

4. A hydraulically transported capsule as claimed in claim 3, wherein the leading end portion of said shell has an inner and an outer fitting portion on the inner periphery and the outer periphery thereof respectively, said cover member made of the flexible member being fitted over said outer fitting portion, and wherein said capsule further includes an inner cover member fitted on said inner fitting portion and made of a rigid material, said first-mentioned cover member being fitted over said outer fitting portion so as to cover said inner cover member.

* * * * *